(12) United States Patent
Moreno et al.

(10) Patent No.: US 9,282,445 B2
(45) Date of Patent: Mar. 8, 2016

(54) BACKUP COVERAGE IN A WIRELESS NETWORK

(75) Inventors: Salvador Pedraza Moreno, Malaga (ES); Juan Ramiro Moreno, Malaga (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 390 days.

(21) Appl. No.: 13/634,651

(22) PCT Filed: Mar. 16, 2011

(86) PCT No.: PCT/US2011/028663
§ 371 (c)(1),
(2), (4) Date: Nov. 26, 2012

(87) PCT Pub. No.: WO2011/116092
PCT Pub. Date: Sep. 22, 2011

(65) Prior Publication Data
US 2013/0060936 A1    Mar. 7, 2013

Related U.S. Application Data

(60) Provisional application No. 61/314,250, filed on Mar. 16, 2010.

(51) Int. Cl.
*G06F 15/173*    (2006.01)
*H04W 4/20*     (2009.01)
*H04L 12/24*    (2006.01)

(52) U.S. Cl.
CPC .............. *H04W 4/20* (2013.01); *H04L 41/0833* (2013.01)

(58) Field of Classification Search
CPC .. H04L 12/5695; H04W 28/26; H04W 72/04; H04W 72/0493; G06F 11/2033; G06F 11/1466; G06F 11/1469
USPC ......... 709/223, 224, 226, 229, 203, 217, 219, 709/231, 238; 370/254, 400; 455/67.13, 455/436, 456.3; 379/413; 713/320
See application file for complete search history.

(56) References Cited

U.S. PATENT DOCUMENTS 6,278,712 B1 * 8/2001 Takihiro et al. ............... 370/400
7,376,097 B2 * 5/2008 Yegin ........................... 370/328

(Continued)

FOREIGN PATENT DOCUMENTS

CN    101141793 A    3/2008
CN    101562850 A    10/2009

OTHER PUBLICATIONS

International Search Report dated Jun. 1, 2011 in PCT/US2011/028663.

(Continued)

*Primary Examiner* — Quang N Nguyen

(57) ABSTRACT

Concepts and technologies are disclosed herein for identifying backup coverage in wireless networks. An active network resource to be analyzed is identified, and a at least one potential backup network resource is identified. The at least one potential backup network resource is evaluated to determine if the at least one potential backup network resource is available to function as the backup coverage for the active network resource. If the at least one potential backup resource is available to function as the backup coverage for the active network resource, a power management parameter associated with the wireless networking environment can be updated.

19 Claims, 4 Drawing Sheets

(56) References Cited

U.S. PATENT DOCUMENTS

| | | | |
|---|---|---|---|
| 7,567,665 B2 * | 7/2009 | Nattkemper et al. | 379/413 |
| 7,606,146 B1 * | 10/2009 | Pan et al. | 709/229 |
| 7,631,007 B2 * | 12/2009 | Morris | 709/224 |
| 7,643,835 B1 * | 1/2010 | Nosack et al. | 455/456.3 |
| 7,930,398 B2 * | 4/2011 | Kawato | 709/226 |
| 8,489,710 B2 * | 7/2013 | Kinoshita et al. | 709/223 |
| 2005/0073962 A1 * | 4/2005 | Zabele et al. | 370/254 |
| 2008/0221858 A1 | 9/2008 | Bagchi et al. | |
| 2010/0015926 A1 * | 1/2010 | Luff | 455/67.13 |
| 2010/0029282 A1 * | 2/2010 | Stamoulis et al. | 455/436 |
| 2011/0320836 A1 * | 12/2011 | Johnston et al. | 713/320 |

OTHER PUBLICATIONS

3GPP TR 36.902 V9.0.0, 3rd Generation Partnership Project; Technical Specification Group Radio Access Network; Evolved Universal Terrestrial Radio Access Network (E-UTRAN); Self-configuring and self-optimizing network use cases and solutions (Release 9), Sep. 2009, 23 pages.

Scully, et al., Review of use cases and framework, INFSO-ICT-216284 Socrates D2.5, Mar. 31, 2009, 84 pages.

* cited by examiner

BACKUP COVERAGE IN A WIRELESS NETWORK

CROSS REFERENCE TO RELATED APPLICATION

This application claims priority to U.S. Provisional Patent Application Ser. No. 61/314,250, entitled "Determining the Availability of Backup Coverage Within a Wireless Network," filed Mar. 16, 2010, which is hereby incorporated by reference in its entirety.

TECHNICAL FIELD

The present disclosure relates generally to wireless networks. More particularly, the present disclosure relates to backup coverage in a wireless network.

BACKGROUND

A goal of mobile and wireless communication system operators is to provide adequate service to customers at a minimum cost. In order to provide adequate service for customers, operators sometimes must provide redundant network equipment and/or other resources to meet demand at peak usage times and/or time periods. At particular times, however, these redundant network equipment and/or resources may be unneeded to provide adequate service, and therefore may generate unnecessary operating costs. These costs can include maintenance costs, hardware and software costs for the equipment, and power, bandwidth, and other network resource consumption associated with the equipment.

Although the demand associated with network resources and/or redundant network resources may fluctuate widely during a particular time period, peak demand requirements may restrict network operators from eliminating the network resources and/or redundant resources from a network. Instead, all of the network resources may be operated, albeit with reduced utilization levels relative to network resources operating at full capacity.

The continuous use of the network resources can increase costs associated with the network resources. Because all available network resources may be needed at times, and because loads and capacity are may be distributed across available network resources, operators may be unable to deactivate network resources. Thus, operating costs associated with the network resources may be treated as fixed costs that cannot be changed.

It is with respect to these and other considerations that the disclosure made herein is presented.

SUMMARY

Concepts and technologies are described herein for identifying backup coverage in a wireless network. In accordance with the concepts and technologies disclosed herein, active network resources within a wireless networking environment can be identified and analyzed to identify one or more backup network resources that can provide backup coverage for the active network resources. The backup network resources can be evaluated to determine if the backup network resources can support services, loads, and/or capacities associated with the active network resources. A set of one or more backup network resources capable of functionality as backup coverage for the active network resources can be identified, and the set of one or more backup resources can be evaluated to determine anticipated degradation levels associated with using the backup network resources as backup coverage for the active network resources.

Based, at least partially, upon the analysis and evaluation of the backup network resources, power management candidates among the active network resources can be identified. The power management candidates include active network resources that can be deactivated to realize power or other resource consumption reduction. Network parameters can be updated to reflect the determined backup network resources and power management candidates, and the network can be operated in accordance with the determined parameters. Thus, the concepts and technologies disclosed herein can be used to provide reduced operation costs associated with wireless networks.

According to one embodiment disclosed herein, a method for identifying backup coverage for an active network resource in a wireless networking environment is disclosed. The method includes identifying an active network resource to be analyzed, identifying a potential backup network resource, and evaluating the potential backup network resource to determine if the potential backup network resource is available to function as the backup coverage for the active network resource. If the potential backup resource is available to function as the backup coverage for the active network resource, a power management parameter associated with the wireless networking environment can be updated.

In some embodiments, evaluating the potential backup network resource includes performing a pixel level analysis in which coverage areas of the potential backup network resource, the active network resource, and/or a safety ring corresponding to one or more network resources surrounding the backup network resource and/or the active network resource are analyzed with respect to each of a plurality of measuring points associated with the coverage areas associated with the active network resource, the backup network resource, and/or the surrounding network resources to determine if the potential backup network resource is capable of providing the backup coverage for the active network resource with respect to the measuring point. In other embodiments, evaluating the potential backup resource includes performing a sector level analysis in which the potential backup network resource is analyzed to determine if use of the potential backup network resource to provide the backup coverage is expected to exhaust capacity of the potential backup network resource. In yet other embodiments, both the pixel level analysis and the sector level analysis are performed. In some embodiments, multiple potential backup network resources can be evaluated, wherein the multiple potential backup network resources can collectively provide the backup coverage.

In some embodiments, in response to determining that use of the potential backup network resource is expected to exhaust capacity of the potential backup network resource, use of the potential backup network resource to provide backup coverage for the active network resource is rejected. Evaluating the potential backup network resource can include determining a degradation level associated with using the potential backup network resource. The degradation level can correspond to a degradation of service associated with using the potential backup network resource to provide the backup coverage for the active network resource. In some embodiments, the degradation level corresponds to a degradation of service that is anticipated if a particular active network resource is powered off. Evaluating the potential backup network resource also can include determining if the potential backup network resource is available to provide backup coverage for the active network resource based, at least partially, upon the degradation level.

In some embodiments, updating the power management parameter associated with the wireless networking environment includes generating data commanding deactivation of the active network resource in response to determining that the potential backup network resource is available to function as the backup coverage for the active network resource. The data generated can include a time period during which the active network resource is to be deactivated. In some implementations, the active network resource includes an active base station in communication with mobile station and the potential backup network resource includes a potential backup base station.

Evaluating the potential backup network resource can include determining if the potential backup base station is available to service a communication serviced by the active base station. The method further can include receiving network resource data associated with the active base station and the potential backup base station. The network resource data includes, in some embodiments, data indicating utilization and capacity data associated with each of the active base station and the potential backup base station. The network resource data is obtained, in some embodiments, from an operations support system (OSS) of the wireless networking environment. Evaluating the potential backup network resource can include evaluating the network resource data to determine if the potential backup base station is capable of functioning as the backup coverage for the active base station. Evaluating the potential backup network resource also can include determining a prioritization scheme indicating an order in which the active resources are to be evaluated and/or an order in which decisions regarding backup coverage for the active network resources are to be made.

According to another embodiment, a central controller is configured to identify backup coverage for an active network resource. The central controller includes a central processing unit in communication with a mass storage device. Execution of computer-executable instructions stored in the mass storage device can cause the central processing unit to identify the active network resource to be analyzed, identify a potential backup network resource, evaluate the potential backup network resource to determine if the potential backup network resource is available to function as the backup coverage for the active network resource, and update a power management parameter associated with a wireless networking environment in response to determining that the potential backup network resource is available to function as the backup coverage for the active network resource. In some embodiments, multiple potential backup network resources can be evaluated, wherein the multiple potential backup network resources can collectively provide the backup coverage.

In some embodiments, execution of the computer-executable instructions stored in the mass storage device further cause the central processing unit to determine that the power management parameter associated with the wireless networking environment is not to be updated, in response to determining that the potential backup network resource is not available to function as the backup coverage for the active network resource. Execution of the computer-executable instructions stored in the mass storage device further can cause the central processing unit to determine a degradation level associated with the potential backup network resource, the degradation level corresponding to a degradation of service associated with using the potential backup network resource to provide the backup coverage for the active network resource if the active network resource is powered off, for example. Execution of the computer-executable instructions further can cause the central processing unit to determine if the potential backup network resource is available to provide backup coverage for the active network resource based, at least partially, upon the degradation level.

In some implementations, execution of the computer-executable instructions stored in the mass storage device cause the central processing unit to determine a time period during which the active network resource is to be evaluated and to evaluate the potential backup network resource to determine if the potential backup network resource is available to function as the backup coverage for the active network resource during the time period. Execution of the computer-executable instructions can further cause the central processing unit to update the power management parameter associated with the wireless networking environment by generating data identifying the active network resource as a power management candidate during the time period, and to identify the potential backup network resource as being available to function as the backup coverage for the active network resource during the time period.

The active network resource can include an active base station in communication with mobile station, the potential backup network resource can include a potential backup base station, and evaluating the potential backup network resource can include determining if the potential backup base station is available to service communication serviced by the active base station. Execution of the computer-executable instructions stored in the mass storage device can cause the central processing unit to receive network resource data associated with the active base station and the potential backup base station. The network resource data can include data indicating utilization and capacity data associated with each of the active base station and the potential backup base station. The network resource data can be obtained, in some embodiments, from an operations support system (OSS) of the wireless networking environment.

According to another embodiment, a method for identifying a backup base station capable of providing backup coverage for an active base station in a wireless networking environment is provided. The method includes identifying the active base station to be analyzed and identifying a backup base station from one or more backup base stations to evaluate as a potential backup coverage provider for the active base station. A degradation level associated with the backup base station can be determined. The degradation level corresponds to a degradation of service associated with using the backup base station to provide the backup coverage for the active base station. In some embodiments, the degradation level corresponds to a degradation of service associated with using the backup base station to provide the backup coverage for the active base station if the active base station is powered off or otherwise deactivated or taken out of service. The backup base station is determined to be available to provide backup coverage for the active base station based, at least partially, upon the degradation level. In response to determining that the backup base station is available to provide the backup coverage for the active base station, a power management parameter associated with the wireless networking environment can be updated. In some embodiments, multiple potential backup base stations can be evaluated, wherein the multiple potential backup base stations can collectively provide the backup coverage.

According to another embodiment, a central controller is configured to identify a backup base station to provide backup coverage for an active base station. The central controller includes a central processing unit in communication with a mass storage device. Execution of computer-executable instructions stored in the mass storage device cause the central processing unit to identify the active base station to be analyzed and identify a backup base station to evaluate as a potential provider of backup coverage for the active base station. The backup base station can be identified from one or more backup base stations. A degradation level associated with the backup base station can be determined, the degradation level corresponding to a degradation of service associated with using the backup base station to provide the backup coverage for the active base station. The backup base station is determined to be available to provide backup coverage for the active base station based, at least partially, upon the degradation level. In response to determining that the backup base station is available to provide the backup coverage for the active base station, a power management parameter associated with the wireless networking environment can be updated. In some embodiments, multiple potential backup base stations can be evaluated, wherein the multiple potential backup base stations can collectively provide the backup coverage.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
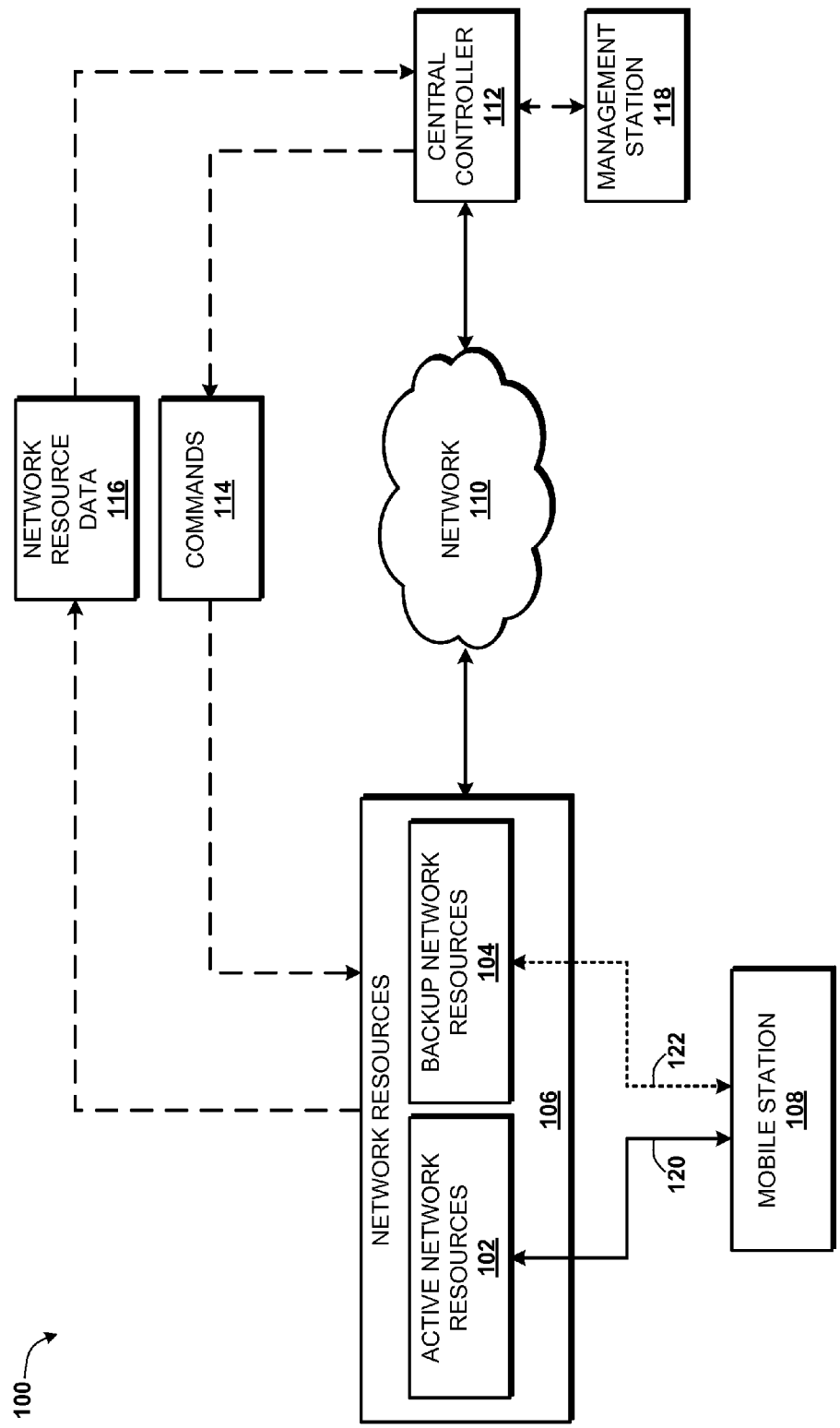
FIG. 1 is a block diagram illustrating a wireless networking environment according to one or more embodiments presented herein.

The following description is directed to concepts and technologies for identifying backup coverage in a wireless network. According to some implementations of the concepts and technologies disclosed herein, a central controller or other device is configured to identify active network resources within a wireless networking environment. The central controller also is configured to identify and analyze one or more backup network resources that are available and/or capable of providing backup coverage for the active network resources. The identified one or more backup network resources can individually and/or collectively provide the backup coverage for the active network resources. The central controller can be configured to evaluate the backup network resources to determine if the backup network resources can support services, loads, and/or capacities associated with the active network resources. The central controller can determine, via the analysis, a set of one or more backup network resources capable of functionality as backup coverage for the active network resources, and can determine anticipated degradation levels associated with using one or more backup network resources as backup coverage for the active network resources.

The central controller also can be configured to analyze and evaluate the active network resources and the backup network resources to identify power management candidates among the active network resources. The central controller can deactivate the power management candidates and/or issue commands for deactivating the power management candidates to conserve power or other resources such as bandwidth, maintenance, network, and/or other resources consumed via operation of the active network resources. The central controller also can update parameters that control operation of the network to reflect the determined backup network resources and power management candidates. The wireless networking environment can be operated in accordance with the determined parameters. Thus, the concepts and technologies disclosed herein can be used to provide reduced operation costs associated with wireless networks. These and other aspects of the concepts and technologies disclosed herein will be discussed in more detail below.

While the subject matter described herein is presented in the general context of program modules that execute in conjunction with the execution of an operating system and application programs on a computer system or embedded processor system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of computing systems and methodologies for identifying backup coverage in a wireless network are described.

Turning now to FIG. 1, a block diagram illustrating a wireless networking environment 100 is provided, according to various embodiments of the concepts and technologies presented herein. In the illustrated embodiment, the wireless networking environment 100 includes active network resources 102 and backup network resources 104, hereinafter collectively referred to as "network resources 106." According to various embodiments, the active network resources 102 include various hardware, software, networks, and/or network components providing services to one or more users or user devices such as, for example, a mobile station 108.

The backup network resources 104 include various hardware, software, networks, and/or network components that have capacity to serve as or provide backup capacity or backup coverage for the active network resources 102 in the event that the active network resources 102 experience a failure, spike in demand, reallocation, and/or other reasons. It should be understood that the backup resources 104 can be actively engaged in various communications when suitability as backup coverage is considered. Thus, the term "backup" with respect to the backup resources 104 refers to functionality as backup coverage for a particular service and the like, and not to activities or operation states. Thus, it should be understood that in some embodiments, the active network resources 102 and the backup network resources 104 can be similar or even identical to one another in terms of structure, functionality, and/or capacity, and that the active network resources 102 and the backup network resources 104 can provide similar or identical functionality within the wireless networking environment 100. Furthermore, it should be understood that multiple backup network resources 104 can collectively provide backup coverage, if desired.

The network resources 106 include computing, hardware, software, networking, and/or other resources used to provide services to one or more users, network nodes, devices, and/or other systems within or in communication with the wireless networking environment 100. For example, the network resources 106 can include cellular communications equipment for communicating with a mobile station 108 operating on or in communication with the wireless networking environment 100. In some implementations, the network resources 106 include, are part of, and/or can communicate with other networks, systems, and/or components associated with the wireless networking environment 100 via a network 110, which can include any combination of wireless and wired networks, including packet-based and/or circuit switched networks.

According to implementations of the concepts and technologies disclosed herein, the network resources 106 include various network components. For example, the network resources 106 can include, but are not limited to, antennas, antenna components, radios, receivers, transceivers, GPRS core network components, location service nodes, an Internet Protocol Multimedia Subsystem (IMS), and/or other systems and/or components. The network resources 106 also can include operations support systems (OSS), base transceiver stations (BTSs), Node-Bs or e-Node-Bs, base station controllers (BSCs), radio network controllers (RNCs), mobile switching centers (MSCs), mobile management entities (MMEs), short message service centers (SMSCs), multimedia messaging service centers (MMSCs), home location registers (HLRs), home subscriber servers (HSSs), visitor location registers (VLRs), charging and/or billing platforms, voicemail platforms, performance management information, probes, combinations thereof, and the like. The network resources 106 also can include other network components, systems, and/or other resources, and therefore should not be construed as being limited to cellular communication hardware and/or software.

According to embodiments, the mobile station 108 includes, but is not limited to, a wireless cellular telephone, a smart phone, a laptop computer, a tablet computer, a desktop computer, a set-top box (STB), a personal data assistant (PDA), a global positioning system (GPS) receiver, an automobile communication system, combinations thereof, and the like. For purposes of simplifying description of the concepts and technologies disclosed herein, the mobile station 108 is described herein as a cellular communications device such as a feature phone or a smart phone. It should be understood that this embodiment is illustrative, and should not be construed as being limiting in any way.

The network resources 106 can communicate with and/or be monitored or controlled by a central controller 112 operating on or in communication with the network 110. The central controller 112 is configured to execute an operating system and one or more application programs. The operating system is a computer program for controlling the operation of the central controller 112. Examples of operating systems include, but are not limited to, a member of the MAC OS, iOS, and/or LEOPARD OS families of operating systems from the Apple Corporation in Cupertino, Calif., a member of the WINDOWS, WINDOWS MOBILE, and/or WINDOWS SERVER families of operating systems from Microsoft Corporation in Redmond, Wash., a member of the LINUX family of operating systems, a member of the SYMBIAN family of operating systems, a member of the BREW family of operating systems from Qualcomm Corporation in San Diego, Calif., a member of the FREEBSD family of operating systems, combinations thereof, and the like.

The application programs executed by the central controller 112 can include one or more executable programs that are configured for execution on top of the operating system to provide the functionality described herein for identifying backup coverage in a wireless network. While the central controller 112 is described herein as executing the application programs to provide the functionality described herein, it should be understood that this embodiment is illustrative. More particularly, in some embodiments, the application programs are embodied in or as one or more hardware devices separate from the central controller 112. Thus, the illustrated embodiment should be understood as being illustrative of one contemplated embodiment, and should not be construed as being limiting in any way.

The central controller 112 is configured to monitor the network resources 106 to identify backup coverage or backup network resources 104 for the active network resources 102. More particularly, the central controller 112 determines active network resources 102 to assess for backup availability, identifies one or more or a set of backup network resources 104 with individual and/or collective capacity to provide backup coverage for the active network resources 102, evaluates the identified one or more backup network resources 104 to identify a level of service degradation possible and/or anticipated if one or more backup network resources 104 are used to provide backup coverage for the active network resources 102, compares the possible service degradation to a maximum tolerated degradation, which can be defined by a network or resource operation or other authorized entity, and takes additional and/or alternative actions based upon the identification and analysis of one or more backup network resources 104. For example, in some embodiments, the central controller 112 deactivates the active network resources 102 or switches the active network resources 102 to a low-power or other reduced-resource-consumption state to conserve power, bandwidth, maintenance, and/or other resources of the wireless networking environment 100.

In some embodiments, the central controller 112 is configured to issue one or more commands 114 to the network resources 106 for executing tests, querying the network resources 106 for utilization and/or load statistics, switching the network resources 106 into low-power or other reduced resource consumption states, combinations thereof, and the like. The central controller 112 also can be configured to receive network resource data 116 from the network resources 106 or from other systems, devices, or networks such as OSS, monitoring systems, reporting systems, combinations thereof, and the like. Thus, while the network resource data 116 is illustrated as being transmitted by the network resources 106, it should be understood that this embodiment is illustrative, as other collection and/or reporting devices are not shown in FIG. 1. The network resource data 116 can be obtained by the central controller 112 via monitoring of the network resources 106 by the central controller 112 and/or other entities configured to monitor the network resources 106 and/or report the network resource data 116 to the central controller 112. It should be understood that the network resources 106 also can be configured to execute a test application (not shown) for generating and/or reporting the network resource data 116 to the central controller 112, if desired.

The network resource data 116 can include data identifying resource utilization statistics, load statistics, power, bandwidth, maintenance, and/or other resource consumption information, real time, historical, and/or anticipated demand information, combinations thereof, and the like. The central controller 112 can be configured to analyze the network resource data 116. Via analysis of the network resource data 116, the central controller 112 can identify the backup network resources 104, determine expected degradation levels if the identified backup network resources 104 used to provide backup coverage for the active network resources 102, compare the expected service degradation to a maximum tolerated degradation or other value, which can be defined by a network or resource operation or other authorized entity, identify power management candidates among the network resources 106, combinations thereof, and the like. These and other processes associated with the central controller 112 will be described in additional detail below with reference to FIGS. 2-3.

According to various embodiments, the central controller 112 can assess the active network resources 102 and/or the backup network resources 104 with respect to particular times and/or time periods. The time period can be as long or as short as desired, depending upon needs or preferences associated with the testing. For example, the central controller 112 can define a relatively short time period such as a number of seconds, minutes, and/or hours for testing of the network resources 106 to identify the backup network resources 104 and/or for other purposes. Similarly, the central controller 112 can define a relatively long time period such as one or more hours or days for testing the network resources 106.

In one non-limiting example, the network resources 106 may be tested over a weekend or a holiday to identify the backup network resources 104, to determine one or more degradation levels, to identify active network resources 102 for which load may be shifted to backup network resources 104, combinations thereof, and the like. Some, none, or all of the above may be determined as being relevant to one or more times or time periods. Similarly, the network resources 106 may be assessed over a number of seconds, minutes, or hours to identify the backup network resources 104, determine degradation levels, identify capacity shift needs, and the like, during the number of seconds, minutes, or hours. It should be understood that these embodiments are illustrative, and should not be construed as being limiting in any way.

The times and/or time periods for or during which the network resources 106 are assessed can be defined by the central controller 112 and/or other sources. In some embodiments, for example, a user interfaces with the central controller 112 via a management station 118. The user can define one or more time periods via the management station 118, if desired. Similarly, the central controller 112 can define the time periods based on network usage models, monitored traffic information, preferences and/or configuration files, combinations thereof, and the like. The availability of backup coverage for the network resources 106, times during which the backup coverage is available, expected degradation levels if the backup coverage is used, maximum tolerated degradation levels or other values associated with the backup coverage, and the like, can be output by the central controller 112, if desired, as output information (not illustrated) and/or the commands 114. As explained above, the commands 114 can be received and acted on by the network resources 106 and/or other entities in communication with the central controller 112.

As will be explained in more detail herein, one or more or a set of backup network resources 104 may be identified as being available to individually and/or collectively support one or more users or subscribers being served by the active network resources 102. Thus, as shown in FIG. 1, the mobile station 108 is illustrated as communicating with the active network resources 102 via an active link 120, and a potential link 122 is illustrated between the mobile station 108. The potential link 122 corresponds to a prospective or potential link between the mobile station 108 and the backup network resources 104, which may be evaluated by the central controller 112.

The central controller 112 is configured to evaluate whether one or more backup network resources 104 are individually or collectively capable and/or have capacity for servicing the mobile station 108 and/or other users or subscribers, to allow powering down or other power management operations to be carried out with respect to the active network resources 102, and/or to make unavailable, to deactivate, and/or to decommission the active network resources 102, and the like. Due to the multi-service nature of modern cellular networks, the above-mentioned evaluations may be carried out for each service that is considered of-interest for determining backup coverage and/or backup coverage availability. Network resources 106 associated with each service or technology may or may not be capable of supporting all services for which backup coverage is desired or needed. For example, a second generation (2G) sector may be unable of providing backup coverage for data services associated with a third generation (3G) sector that provides full support for web browsing or other data services. The 2G resource, however, may be able to effectively provide backup coverage for the 3G resource with respect to voice communications. It should be understood that this example is illustrative, and should not be construed as being limiting in any way.

The central controller 112 can execute various mathematical optimization routines for identifying one or more or a set of backup network resources 104 to be considered as candidates for backup coverage for one or more or a set of active network resources 102. The network resource data 116 therefore may include various information about the network resources 106 including, but not limited to, locations associated with the network resources 106, antenna heights, mechanical antenna tilts, electrical antenna tilts, antenna azimuth positions, power settings, power amplifiers, pilot signals, power thresholds, elevation maps, traffic maps, clutter data, load data, radio propagation environments, operations support system (OSS) statistics, call traces, and any other information available related to the nature and operation of the network resources.

The central controller 112 can perform various analyses, described herein in more detail, to identify backup coverage, and to evaluate whether the identified backup coverage is able to provide full backup service coverage for the active network resources 102 to allow power management with respect to the active network resources 102, and/or for other purposes. According to some implementations, the central controller 112 is configured to execute two or more levels of analysis to make these and other determinations. In some embodiments, the central controller 112 is configured to analyze the network resources 106 using a "pixel level" analysis. As used herein, a single "pixel" refers to a sampling or measuring point within the wireless network environment 100.

In the pixel level analysis, each relevant pixel is analyzed. The relevant pixels are the pixels within the coverage area of the evaluated active network resource 102, the coverage area of the evaluated backup network resource(s) 104, and the coverage area of a potential safety ring associated with the active network resources 102 and the backup network resources 104. The "safety ring" can include resources that border the coverage area. Evaluation of the safety ring can be used to determine and measure border effects of the evaluated backup coverage scenario. More particularly, the pixel level analysis of backup coverage can be performed to analyze the backup coverage with respect to each pixel associated with the coverage area of the active network resources 102, each pixel associated with the coverage area of the backup network resources 104 capable of providing backup coverage, and/or each pixel of the coverage area associated with other network resources 106 that correspond to a potential safety ring bordering the active network resources 102 and/or the backup network resources 104.

Based on physical characteristics, network planning information, and/or other data, common and dedicated signals of the potential backup network resources 104 may be examined to determine if the dedicated signals can be received at the pixel of the coverage area under consideration, and if so, what level and/or quality at or with which the signals can be received. The pixel analysis can be iterated for each pixel within the coverage area of the active network resources 102, the coverage area of the potential backup network resources 104, and/or the coverage area associated with the safety ring referred to herein. These and other metrics may depend upon the type of signal, for example common signals or dedicated signals, as well as one or more technologies, protocols, standards, and the like, associated with the potential backup network resource 104. For example, if the potential backup network resource 104 includes a Universal Mobile Telecommunications System (UMTS) sector, the availability of the control signals can be evaluated through the computation of the received Common Pilot Channel (CPICH) Received Signal Code Power (RSCP) and Ec/Io, where Ec/Io is the ratio of average CPICH power, i.e., received pilot energy, Ec, to total received energy or the total power spectral density, Io. Similarly, if the active network resource 102 being evaluated by the central controller 112 is associated with an R99 power controller, the availability of the dedicated signals may be evaluated according to an energy per bit to noise density ratio (Eb/No) achieved when the sector is transmitting the dedicated signals at maximum allowed power. Similarly, a minimum required throughput for High Speed Downlink Packet Access (HSDPA) connections may be evaluated. Also, the impact of various occurrences and conditions, for example, a soft handover, may also be taken into consideration by the central controller 112 during the pixel level analysis.

The availability of backup network resources 104 also can be evaluated at a second level of analysis. The second level of analysis can include a sector level analysis. In the sector level analysis, additional load can be considered by the central controller 112 for every sector associated with one or more or a set of backup network resources 104. This analysis may be relevant to capacity, service quality, and/or other performance metrics associated with the network resources 106. If the additional load of serving as a backup network resources 104 is determined to pose a threat of exhausting a capacity of the backup network resources 104, for example a backup sector, the central controller 112 can be configured to reject consideration of the backup network resource 104 as capable of providing backup coverage and/or functioning as a backup service. Similarly, the central controller 112 can consider communications quality. Thus, the central controller 112 can identify and determine levels of service or signal degradation, if desired. It should be appreciated that in addition to, or instead of, the pixel and sector granularities described above, availability of the backup network resources 104 can be evaluated at other levels including, but not limited to, levels in which Iub capacity, RNC capacity, and/or other aspects of the wireless networking environment 100 are considered.

According to various embodiments, the central controller 112 may identify a number of sets of backup network resources 104 that can collectively provide backup coverage for the active network resources 102. The sets of backup network resources 104 can be identified as collectively having the capacity to support some percentage of the existing load associated with the active network resources 102, should the active network resources 102 under assessment become unavailable or deactivated, or for power management operations such as powering down network resources 102 and/or switching the network resources 102 to a low power operation state. Thus, it should be understood that the central controller 112 can identify one or more backup network resources 104 and/or one or more sets of backup network resources 104 that collectively or individually can provide backup coverage, if desired.

Embodiments of the concepts and technologies disclosed herein can support improved performance of the wireless networking environment 100. Similarly, operators or other authorized entities can determine candidate active resources 102 for deactivation while moving load associated with the active network resources 102 to backup network resources 104 such that no service loss will be encountered or such that a specified acceptable grade of service is maintained and/or to provide various power management functions within the wireless networking environment 100. Thus, the central controller 112 can identify backup coverage while taking anticipated degradation levels associated with using the backup network resources 104 into account during the analysis. The anticipated degradation levels can be compared to maximum tolerated degradation levels or other values or thresholds, which can be set by network operators or other authorized entities, preferences, analysis, and/or other entities and/or methods. Operators or other authorized entities also may identify cases in which active network resources 102 should not be deactivated. For example, the central controller 112 may determine that active network resources 102 have no suitable backup network resources 104 in a particular operation state or geographic location.

FIG. 1 illustrates multiple active network resources 102, multiple backup network resources 104, one mobile station 108, and one central controller 112. It should be understood, however, that some implementations of the wireless networking environment 100 include one or more active network resources 102, one or more backup network resources 104, multiple mobile stations 108, and/or multiple central controllers 112. Therefore, the illustrated embodiment should be understood as being illustrative, and should not be construed as being limiting in any way.

Figure 2:
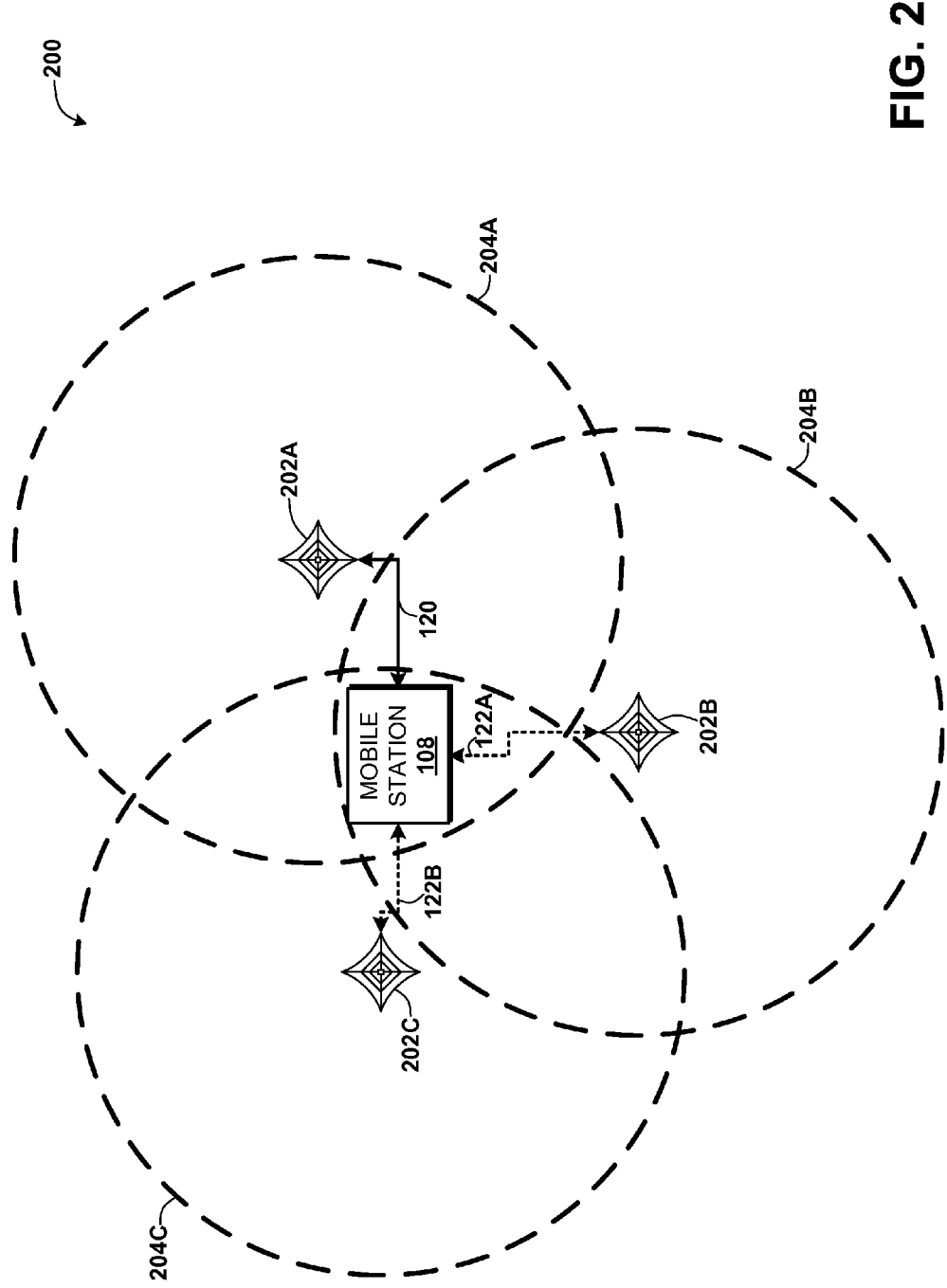
FIG. 2 is a line diagram illustrating additional aspects of the concepts and technologies disclosed herein.

Turning now to FIG. 2, additional aspects of the concepts and technologies disclosed herein for identifying backup coverage in a wireless network are described in detail. In particular, FIG. 2 illustrates a line diagram showing an example scenario in which the availability of backup coverage may be considered and/or in which backup network resources 104 may be implemented for active network resources 102. It should be understood that the embodiment illustrated in FIG. 2 is illustrative of only one contemplated scenario and should not be construed as being limiting in any way.

In FIG. 2, three base stations 202A-C (hereinafter collectively referred to as "base stations 202") are illustrated. The base stations 202 can include various hardware and software including, but not limited to, one or more antennas, antenna positioning systems, radio frequency components, sectors, amplifiers, transceivers, relay modules, power supplies, and various other subsystems and components associated with mobile communication base station systems. Thus, the base stations 202 can be or can include one or more of the network resources 106 described above with reference to FIG. 1.

Three coverage areas 204A-C (hereinafter collectively referred to as "coverage areas 204") are illustrated in FIG. 2. The coverage areas 204A-C correspond, respectively, to coverage areas of the base stations 202A-C. In particular, the coverage area 204A is associated with the base station 202A, the coverage area 204B is associated with the base station 202B, and the coverage area 204C is associated with the base station 202C. As shown in FIG. 2, the coverage areas 204 may or may not overlap partially and/or completely. It should be understood that the illustrated base stations 202, the coverage areas 204, and their respective overlaps are illustrative, and should not be construed as being limiting in any way.

In the scenario illustrated in FIG. 2, the mobile station 108 is located at a location at which the coverage areas 204 of the base stations 202 overlap. As such, the mobile station 108 can be serviced by any of and/or more than one of the three base stations 202. Thus, any of the three base stations 202 and/or combinations thereof may service calls, data communications, and/or other traffic associated with the mobile station 108 when the mobile station 108 is located at the illustrated location. For purposes of simplifying the description of the concepts and technologies disclosed herein, it will be assumed with respect to FIG. 2 that the mobile station 108 communicates with the base station 202A, via the active link 120, and that the communications serviced by the base station 202A correspond to a voice communication ("call"). Thus, the base station 202A is described in FIG. 2 as corresponding to the active network resource 102 described above in FIG. 1, and is referred to in FIG. 2 as the active base station 202A. Similarly, while the base station 202B-C are activated, the base stations 202B-C may not be handling load associated with the base station 202A. The base stations 202B-C are described as corresponding to the backup network resources 104 described in FIG. 1 and are referred to in FIG. 2 as backup base stations 202B-C. It should be understood that this embodiment is illustrative, and should not be construed as being limiting in any way.

According to various implementations of the concepts and technologies disclosure herein, the central controller 112 is configured to analyze information associated with one or more of the base stations 202B-C to determine if either or both of the base stations 202B-C can individually and/or collectively function as a backup base station(s) 202B-C for the active base station 202A servicing the call associated with the mobile station 108. Thus, the central controller 112 is configured to test and/or assess each of the base stations 202B-C to determine if each or both of the base stations 202B-C can function as backup resource(s) 104 for the active base station 202A during a particular time, for example, if the mobile station 108 remains stationary and/or travels within one or more of the coverage areas 204, if the base station 202A is powered down, goes offline, and the like. FIG. 2 illustrates the active link 120 described in FIG. 1 as existing between the base station 202A and the mobile station 108, and two potential links 122A-B similar to the potential link 122 described in FIG. 1 between the mobile station 108 and the base stations 202B-C, respectively. It should be understood that this embodiment is illustrative, and should not be construed as being limiting in any way.

As explained herein, the base stations 202 and/or other network resources 106 of the wireless networking environment 100, such as entire base stations or equipment within a base station supporting specific cells, sectors, frequency bands, or services, may be identified as having capacity to provide backup coverage for the active base stations 202B-C and/or other active network resources 102. As explained above, the active base station 202A and/or other active network resources 102 identified as having available backup coverage may be periodically, temporarily, or permanently deactivated for various purposes such as, for example, energy savings, reduced resource usage, and the like. Backup coverage for the active base station 202A and/or other active network resources 102 may be determined based on various data including, but not limited to, physical information associated with the wireless networking environment 100 and/or the network resources 106, network planning information, elevation and clutter maps, historical information and statistics, load and utilization information, other data, and the like.

Thus, embodiments of the concepts and technologies presented herein may determine if backup network resources 104 such as the base stations 202B-C are available to serve one or more or a set of subscribers such as the mobile station 108 being served by the active network resources 102 such as the base station 202A if the base station 202A or other active network resources 102 become unavailable, powered down or switched to low power states for power management purposes, and/or otherwise deactivated. While the concepts and technologies disclosed herein can be used to identify one or more or a set of the backup network resources 104, it should be understood that according to various implementations, the central controller 112 is configured to identify a configurable number of sets of backup network resources 104. The sets of backup network resources 104 can be configured such that the backup network resources 104 collectively cover some, none, all of, or some percentage of, current subscribers or users of the active network resources 102. If backup coverage for all active network resources 102 is not identified by the central controller 112 as being available, the central controller 112 can identify a service level score or percentage of service and assigned to an identified backup configuration.

According to aspects of the concepts and technologies presented herein, network resources 106 in the wireless networking environment 100 may be identified for deactivation, either permanently or during specific periods for power management. A prioritization scheme may be established by the central controller 112 for determining an order in which the network resources 106 are to be evaluated for backup coverage, as well as an order in which decisions relating to backup coverage for the network resources 106 are to be made. It should be understood that other prioritization schemes can be relied upon and/or determined via various embodiments of the concepts and technologies disclosed herein.

Some, none, all, and/or each deactivation of a network resource 106 can trigger a reevaluation of remaining network resources 106 to identify additional or alternative candidates for deactivation. The order or prioritization corresponding to an order in which the network resources 106 are evaluated or reevaluated may be determined by the central controller 112 via execution of various optimization routines. Optimizations routines like those used for automated network planning may be adapted to prioritize deactivation of the network resources 106 within the wireless networking environment 100.

The concepts and technologies disclosed herein can be used in conjunction with various wireless communication network technologies in various combinations. For example, the concepts and technologies disclosed herein may be applied to mobile communication wireless cells, wireless network operating zones, various granularities of operation within those or other resources, combinations thereof, and the like. Furthermore, a service or frequency band may be specified as the network resource 106 for testing, assessment, and/or other analysis for identifying backup coverage. Furthermore, the concepts and technologies disclosed herein may be applied to various mobile technologies operating in accordance with various standards and/or protocols including, but not limited to, 2G Global System for Mobile communications (GSM), General Packet Radio Service (GPRS) and/or Enhanced Data rates for GSM Evolution (EDGE) standards, 3G technologies, 3G UMTS, High-Speed Packet Access (HSPA), HSDPA, Enhanced Uplink (EUL)/High-Speed Uplink Packet Access (HSUPA), and/or the Evolved HSPA (HSPA+), fourth generation (4G) technologies such as, for example, Long Term Evolution (LTE) technologies, LTE-A, Worldwide Interoperability for Microwave Access (WiMAX) technologies, and the like. The concepts and technologies disclosed herein also can be employed in networks using Code Division Multiple Access (CDMA) technologies, wideband CDMA (WCDMA) technologies, time division multiple access (TDMA) technologies, any other wireless communication network standards, protocols, or technology, combinations thereof, and the like. While the wireless networking environment 100 is described as including a cellular communications network, it should be understood that the concepts and technologies disclosed herein can also be used in non-cellular wireless networks such as WIFI networks, BLUETOOTH communications, and the like.

Figure 3:
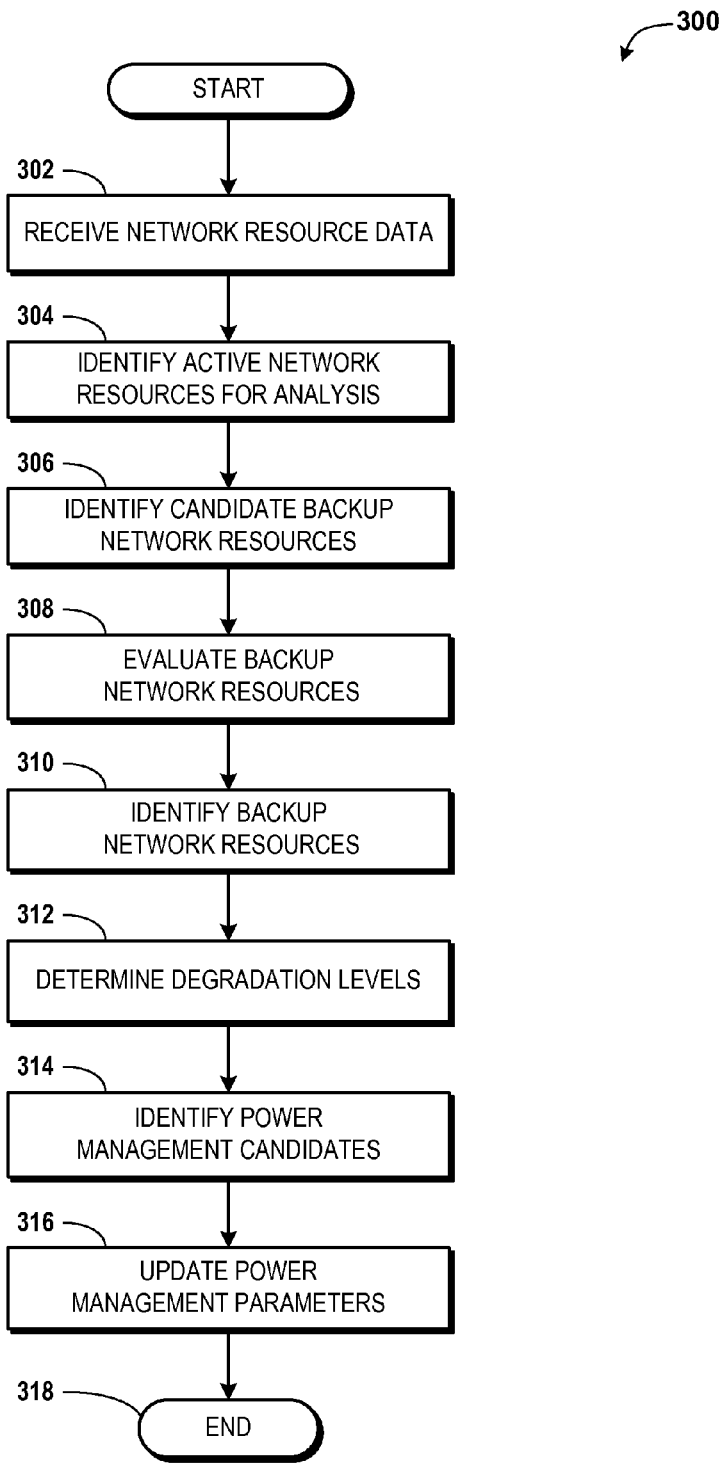
FIG. 3 is a logical flow diagram illustrating a process for identifying backup coverage in a wireless network, according to some embodiments presented herein.

Turning now to FIG. 3, aspects of a method 300 for identifying backup resources in a wireless network will be described in detail, according to some embodiments presented herein. It should be understood that the operations of the method 300 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the method 300 can be ended at any time and need not be performed in its entirety. Some or all operations of the method 300, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent upon the performance and/or other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts and technologies disclosed herein, it should be understood that the method 300 may be performed by the central controller 112. It should be understood that the central controller 112, as well as additional and/or alternative devices and/or network nodes, can provide the functionality described herein via execution of one or more application programs. Furthermore, it should be understood that the functionality of the central controller 112 can be provided by any number of devices or network nodes, and is not limited to the central controller 112 illustrated in the FIGURES.

The method 300 begins and proceeds to operation 302, where network resource data 116 is received. The network resource data 116 may include physical information about the network resources 106, information for or generated by network planning operations, or any other information about the wireless network 100 and/or the network resources 106. The network resource data 116 used in making backup coverage determinations may include, but is not limited to, locations of the network resources 106, antenna heights, mechanical antenna tilts, electrical antenna tilts, antenna azimuth positions, power settings, power consumption information, power amplifier information, pilot signal information, power threshold information, elevation maps, network and/or user traffic maps and other information, clutter data, load data, utilization data, radio propagation environment information, OSS statistics, call trace information, other information related to the nature and/or operation of the network resources 106, combinations thereof, and the like. In some embodiments, a maximum tolerated degradation or other value is retrieved in operation 302. As noted above, the maximum tolerated degradation, or other values and/or thresholds, can be set by network operators, preferences, settings, software, and/or other entities.

From operation 302, the method 300 proceeds to operation 304. At operation 304, active network resources 102 are identified for assessment to identify backup network resources 104. It should be understood that one or more of the active network resources 102 may be identified for assessment in operation 304. Thus, one or more of the active network resources 102 can be identified for analysis as to whether backup network resources 104 are available. More particularly, the network resource data 116 associated with the active network resources 102 identified in operation 304 is analyzed to determine if there are any network resources 106 available to function as the backup network resources 104. As mentioned above, the active network resources 102 and/or the backup network resources 104 can include wireless cells, sectors, base stations, service types, operating frequency bands, antennas, and/or other physical or logical aspects of the network resources 106.

From operation 304, the method 300 proceeds to operation 306. At operation 306, candidate backup resources 104 may be identified from the backup network resources 104 identified in operation 304. As such, the network resource data 116 associated with the backup network resources 104 can be analyzed to identify one or more of the backup network resources 104 that can operate individually and/or collectively as the backup network resources 104. In operation 306, one or more, or a set of candidate backup network resources 104 may be identified as potential backup network resources 104 for the active network resources 102. The candidate backup resources 104 are potential replacements for handling, managing, and/or otherwise providing services, traffic, and/or other network load provided by the active network resources 102, or for providing backup coverage for the active network resources 102 during power saving efforts and/or during other power management operations. As noted above, the candidate backup resources 104 can collectively and/or individually provide backup coverage for the active network resources 102.

From operation 306, the method 300 proceeds to operation 308. At operation 308, the backup network resources 104 are evaluated on one or more granularity levels. As mentioned above, the backup network resources 104 are evaluated in one or more of a pixel level, a sector level, and/or other levels of analysis. As mentioned above, the central controller 112 can perform a pixel level analysis of the backup network resources 104, a sector level analysis of the backup network resources 104, and/or other levels of analysis, if desired. Because the backup network resources 104 can collectively or individually provide backup coverage for the active network resources 102, it should be understood that the pixel level, sector level, and/or other levels of analysis can be conducted on the backup network resources 104 collectively and/or individually, if desired.

From operation 308, the method 300 proceeds to operation 310. At operation 310, the results of the analysis described above with reference to operation 308 can be reviewed, and one or more, or a set of backup network resources 104 can be recommended. More particularly, of the potential candidate backup network resources 104 identified in operation 306, one or more, or a set of the backup network resources 104 determined via the analysis of operation 308 to be individually and/or collectively capable and/or suited for handling the traffic associated with the active network resources 102 is/are identified.

From operation 310, the method 300 proceeds to operation 312. At operation 312, a degradation level may be determined for the one or more, or set of, the backup network resources 104 recommended in operation 310. From the evaluation performed at operation 308, it may be determined that some, all, or none of the load or capacity supported, provided by, and/or otherwise associated with the network resources 106 identified for assessment in operation 304 can be provided with backup capacity or support by the recommended one or more or set of backup network resources 104 identified in operation 310. In some embodiments, if less than all of the load or capacity associated with network resources 106 can be provided with backup capacity or support by the suggested set of backup network resources 104, a percentage, probability, or other measure of an expected, anticipated, or possible degradation level can be determined. This measure can correspond to a likelihood of failure, loss, dropped calls, and/or other anticipated effects that may result from the load, capacity, or service associated with the active network resources 102 being shifted, switched, or otherwise allocated or reallocated to the one or more or set of backup network resources 104. As explained above, the degradation level can be compared to a maximum tolerable degradation level, if desired, which can be set by network operators and/or other entities or systems.

From operation 312, the method 300 proceeds to operation 314. At operation 314, one or more of the active network resources 102 may be identified as power management candidates. According to some embodiments, if, according to the evaluation described above with reference to operation 308, capacity or load associated with an active network resource 102 identified for assessment in operation 304 can be individually or collectively covered or serviced by one or more or a set of backup network resources 104, as determined in operation 306, the active network resource 102 being assessed can be identified as a power management candidate, and can be deactivated at one or more times or time periods. The deactivation of the active network resource 102 can be performed to provide reduced power consumption and/or other network resource reductions. Thus, the deactivation of the active network resource 102 can help realize energy reduction, power management, and/or other cost savings. It should be appreciated that the identification of the backup network resources 104 can be performed for specified times, periods of time, specific load characteristics, and/or other variables. In such cases, the assessed active network resource 102 may be deactivated for one or more times, periods of time, and/or load characteristics.

From operation 314, the method 300 proceeds to operation 316. At operation 316, power management parameters may be updated to reflect the analysis performed in accordance with the method 300. More particularly, the identities of the one or more active network resources 102 identified as power management candidates in operation 314 can be used to vary various settings associated with the network resources 106. For example, active network resources 102 that have available backup network resources 104 can be set to operate in one or more power saving modes at specified times or time periods. Power saving modes can be used to help improve power consumption profiles associated with various network resources 106 within the wireless networking environment 100.

From operation 316, the method 300 proceeds to operation 318. The method 300 can terminate at operation 318. It should be appreciated that the method 300 may also be repeated periodically or continuously.

Figure 4:
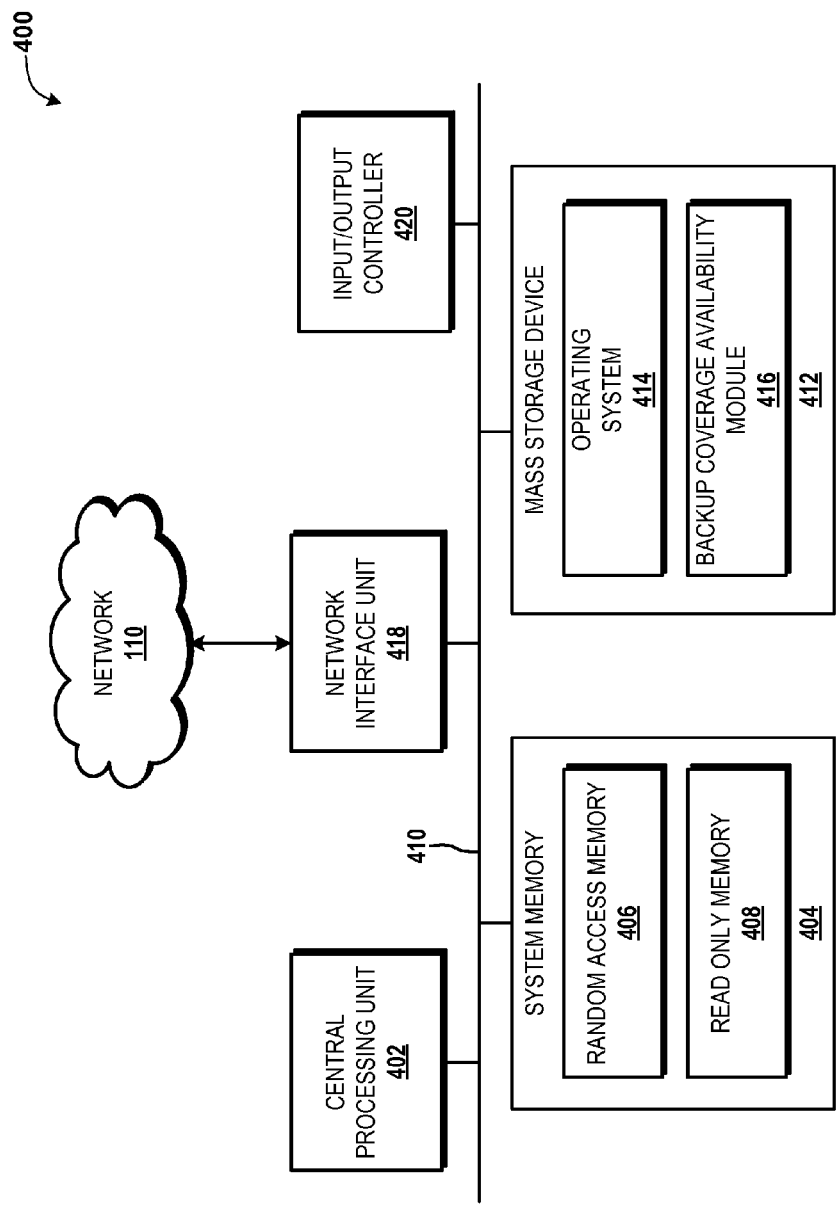
FIG. 4 is a computer architecture diagram illustrating computing system hardware capable of identifying backup coverage in a wireless network, according to some embodiments presented herein.

Turning now to FIG. 4, an illustrative computer architecture 400 for a computing device capable of executing software components described herein for identifying backup resources in a wireless network will be described. The computer architecture 400 shown in FIG. 4 illustrates an embedded control computer, a desktop computer, a laptop computer, a server computer, a cellular telephone, a smart phone, a PDA, combinations thereof, and the like, and can be configured to execute aspects of the software components presented herein. For example, a device having an architecture similar to the computer architecture 400 of FIG. 4 may serve as the central controller 112, the management station 114, the mobile station 108, and/or a controller, base station controller, or other device associated with one or more of the base stations 202. It should be appreciated that the described software components can also be executed on other example computing environments, such as game consoles, television displays, STBs, kiosks, vehicular information systems, embedded computer systems, combinations thereof, and the like.

The computer architecture 400 includes a central processing unit 402 (CPU), a system memory 404, which includes a random access memory (RAM) 406 and a read-only memory (ROM) 408, and a system bus 410 that can couple the system memory 404 to the CPU 402. A basic input/output system containing the basic routines that help to transfer information between elements within the computer architecture 400, such as during startup, can be stored in the ROM 408. The computer architecture 400 may further include a mass storage device 412. The mass storage device 412 can store an operating system 414, as well as software, data, and various program modules. In the illustrated embodiment, the mass storage device 412 stores a backup coverage availability module 416. Execution of the backup coverage availability module 416 by the CPU 402 can cause a computing system embodying the computer architecture 400 to provide functionality such as that described above with reference to FIGS. 1-3.

The mass storage device 412 can be connected to the CPU 402 through a mass storage controller (not illustrated) connected to the bus 410. The mass storage device 412 and its associated computer-readable media can provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, a computing system embodying the computer architecture 400 may operate in a networked environment using logical connections to remote computers through a network such as the network 110. The computing system embodying the computer architecture 400 may connect to the network 110 through a network interface unit 418 connected to the bus 410. It should be appreciated that the network interface unit 418 may also be utilized to connect to other types of networks and remote computer systems. The computing system embodying the computer architecture 400 may also include an input/output controller 420 for receiving and processing input from a number of other devices, including a keyboard, mouse, or electronic stylus (not illustrated). Similarly, the input/output controller 420 may provide output to a video display, a printer, or other type of output device (also not illustrated).

As mentioned briefly above, a number of program modules and data files may be stored in the mass storage device 412 and RAM 406 of a computing system embodying the computer architecture 400. The program modules and data files include, but are not limited to, an operating system 414 suitable for controlling the operation of a desktop computer, laptop computer, server computer, mobile telephone, and/or other computing device or environment. The mass storage device 412, ROM 408, and RAM 406 may also store one or more program modules. In particular, the mass storage device 412, the ROM 408, and the RAM 406 may store the backup coverage availability module 416 for execution by the CPU 402. The backup coverage availability module 416 can include software components for implementing some, all, or none of the processes discussed in detail above with reference to FIGS. 1-4. The mass storage device 412, the ROM 408, and the RAM 406 may also store other types of program modules.

Software modules, such as the backup coverage availability module 416 may be associated with the system memory 404, the mass storage device 412, or otherwise. The software modules may include software instructions that, when loaded into the CPU 402 and executed, transform a general-purpose computing system into a special-purpose computing system customized to facilitate all, or part of, the techniques for identifying backup coverage in a wireless network as disclosed herein. As detailed throughout this description, the program modules may provide various tools or techniques by which the a computing system embodying the computer architecture 400 may participate within the overall systems or operating environments using the components, logic flows, and/or data structures discussed herein.

The CPU 402 may be constructed from any number of transistors or other circuit elements, which may individually or collectively assume any number of states. More specifically, the CPU 402 may operate as a state machine or finite-state machine. Such a machine may be transformed to a second machine, or specific machine by loading executable instructions contained within the program modules. These computer-executable instructions may transform the CPU 402 by specifying how the CPU 402 transitions between states, thereby transforming the transistors or other circuit elements constituting the CPU 402 from a first machine to a second machine, wherein the second machine may be specifically configured to support real time event driven energy management. The states of either machine may also be transformed by receiving input from one or more user input devices associated with the input/output controller 420, the network interface unit 418, other peripherals, other interfaces, or one or more users or other actors. Either machine may also transform states, or various physical characteristics of various output devices such as printers, speakers, video displays, or otherwise.

Encoding of the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the system memory 404 when the software is encoded therein. For example, the software may transform the state of transistors, capacitors, or other discrete circuit elements constituting the system memory 404.

As another example, the storage media may be implemented using magnetic or optical technology. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Based on the foregoing, it should be appreciated that technologies for identifying backup coverage in wireless networks are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementation.

The subject matter described above is provided by way of illustration only and should not be construed as limiting. Various modifications and changes may be made to the subject matter described herein without following the example embodiments and applications illustrated and described, and without departing from the true spirit and scope of the present invention.

We claim:

1. A computer-implemented method for identifying backup coverage for an active network resource in a wireless networking environment, the method comprising computer-implemented operations for:
   identifying the active network resource to be analyzed;
   identifying at least one backup network resource;
   evaluating the at least one backup network resource to determine if the at least one backup network resource is available to function as the backup coverage for the active network resource; and
   prompting updating of a power management parameter associated with the wireless networking environment in response to determining that the at least one backup network resource is available to function as the backup coverage for the active network resource, wherein prompting updating of the power management parameter associated with the wireless networking environment comprises generating data commanding deactivation or a switch to reduced power of the active network resource in response to determining that the at least one backup network resource is available to function as the backup coverage for the active network resource.

2. The method of claim 1, wherein evaluating the at least one backup network resource comprises performing a pixel level analysis in which the backup network resource and the active network resource are analyzed with respect to each measuring point associated with a coverage area of the backup network resource and the active network resource in the wireless networking environment to determine if the at least one backup network resource is capable of providing the backup coverage for the active network resource with respect to the measuring point.

3. The method of claim 1, wherein evaluating the at least one backup resource comprises performing a sector level analysis in which the at least one backup network resource is analyzed to determine if use of the at least one backup network resource to provide the backup coverage is expected to exhaust capacity of the at least one backup network resource.

4. The method of claim 2, wherein evaluating the at least one backup resource comprises performing a sector level analysis in which the at least one backup network resource is analyzed to determine if use of the at least one backup network resource to provide the backup coverage is expected to exhaust capacity of the at least one backup network resource.

5. The method of claim 4, wherein in response to determining that use of the at least one backup network resource is expected to exhaust capacity of the at least one backup network resource, rejecting use of the at least one backup network resource to provide backup coverage for the active network resource.

6. The method of claim 1, wherein evaluating the at least one backup network resource further comprises:
   determining a degradation level associated with the at least one backup network resource, the degradation level corresponding to a degradation of service associated with using the at least one backup network resource to provide the backup coverage for the active network resource; and
   comparing the degradation level to a maximum tolerated degradation level,
   wherein evaluating the at least one backup network resource to determine if the at least one backup network resource is available to function as the backup coverage for the active network resource is based, at least partially, upon determining if the degradation level exceeds the maximum tolerated degradation level.

7. The method of claim 1, wherein the data comprises a time period during which the active network resource is to be deactivated.

8. The method of claim 1, wherein the active network resource comprises an active base station in communication with a mobile station, the at least one backup network resource comprises at least one backup base station, and evaluating the at least one backup network resource comprises determining if the at least one backup base station is available to service a communication serviced by the active base station.

9. The method of claim 8, further comprising receiving network resource data associated with the active base station and the at least one backup base station, the network resource data comprising data indicating utilization and capacity data associated with each of the active base station and the at least one backup base station.

10. The method of claim 9, wherein evaluating the at least one backup network resource comprises evaluating the network resource data to determine if the at least one backup base station is capable of functioning as the backup coverage for the active base station.

11. The method of claim 1, further comprising determining a prioritization scheme indicating an order in which the active resources are evaluated.

12. A central controller configured to identify backup coverage for an active network resource, the central controller comprising a central processing unit in communication with a mass storage device, wherein execution of computer-executable instructions stored in the mass storage device cause the central processing unit to:
   identify the active network resource to be analyzed;
   identify at least one backup network resource;

evaluate the at least one backup network resource to determine if the at least one backup network resource is available to function as the backup coverage for the active network resource; and prompt update of a power management parameter associated with a wireless networking environment in response to determining that the at least one backup network resource is available to function as the backup coverage for the active network resource, wherein prompting updating of the power management parameter associated with the wireless networking environment comprises generating data commanding deactivation or a switch to reduced power of the active network resource in response to determining that the at least one backup network resource is available to function as the backup coverage for the active network resource.

13. The central controller of claim 12, wherein execution of the computer-executable instructions stored in the mass storage device further cause the central processing unit to determine that the power management parameter associated with the wireless networking environment is not to be updated, in response to determining that the at least one backup network resource is not available to function as the backup coverage for the active network resource.

14. The central controller of claim 12, wherein execution of the computer-executable instructions stored in the mass storage device further cause the central processing unit to:

determine a degradation level associated with the at least one backup network resource, the degradation level corresponding to a degradation of service associated with using the at least one backup network resource to provide the backup coverage for the active network resource, wherein evaluating the at least one backup network resource to determine if the at least one backup network resource is available to function as the backup coverage for the active network resource is based, at least partially, upon the degradation level.

15. The central controller of claim 14, wherein execution of the computer-executable instructions stored in the mass storage device cause the central processing unit to:

determine a time period during which the active network resource is to be evaluated;

evaluate the at least one backup network resource to determine if the at least one backup network resource is available to function as the backup coverage for the active network resource during the time period; and prompt update of the power management parameter associated with the wireless networking environment by generating data identifying the active network resource as a power management candidate during the time period and identifying the at least one backup network resource as being available to function as the backup coverage for the active network resource during the time period.

16. The central controller of claim 12, wherein the active network resource comprises an active base station in communication with a mobile station, the at least one backup network resource comprises at least one backup base station, and evaluating the at least one backup network resource comprises determining if the at least one backup base station is available to service a communication serviced by the active base station.

17. The central controller of claim 12, wherein execution of the computer-executable instructions stored in the mass storage device cause the central processing unit to receive network resource data associated with the active base station and the at least one backup base station, the network resource data comprising data indicating utilization and capacity data associated with each of the active base station and the at least one backup base station.

18. A computer-implemented method for identifying at least one backup base station capable of providing backup coverage for an active base station in a wireless networking environment, the method comprising computer-implemented operations for:

identifying the active base station to be analyzed;

identifying at least one backup base station from a plurality of backup base stations to evaluate as a backup coverage provider for the active base station;

determining a degradation level associated with the at least one backup base station, the degradation level corresponding to a degradation of service associated with using the at least one backup base station to provide the backup coverage for the active base station;

comparing the degradation level to a maximum tolerated degradation level;

determining if the at least one backup base station is available to provide backup coverage for the active base station based, at least partially, upon determining if the degradation level exceeds the maximum tolerated degradation level; and prompting updating of a power management parameter associated with the wireless networking environment in response to determining that the at least one backup base station is available to provide the backup coverage for the active base station.

19. A central controller configured to identify at least one backup base station to provide backup coverage for an active base station, the central controller comprising a processing unit in communication with a mass storage device, wherein execution of computer-executable instructions stored in the mass storage device cause the central processing unit to:

identify the active base station to be analyzed;

identify the at least one backup base station to evaluate as a potential provider of backup coverage for the active base station, the at least one backup base station being identified from a plurality of backup base stations;

determine a degradation level associated with the at least one backup base station, the degradation level corresponding to a degradation of service associated with using the at least one backup base station to provide the backup coverage for the active base station;

compare the degradation level to a maximum tolerated degradation level;

determine if the at least one backup base station is available to provide backup coverage for the active base station based, at least partially, upon determining if the degradation level exceeds the maximum tolerated degradation level; and prompt update of a power management parameter associated with the wireless networking environment in response to determining that the at least one backup base station is available to provide the backup coverage for the active base station.

* * * * *

UNITED STATES PATENT AND TRADEMARK OFFICE
CERTIFICATE OF CORRECTION

| | | |
|---|---|---|
| PATENT NO. | : 9,282,445 B2 | Page 1 of 1 |
| APPLICATION NO. | : 13/634651 | |
| DATED | : March 8, 2016 | |
| INVENTOR(S) | : Moreno et al. | |

It is certified that error appears in the above-identified patent and that said Letters Patent is hereby corrected as shown below:

On the Title Page,

In item (75), under "Inventors", in Column 1, Line 1, delete "Malaga" and insert -- Málaga --, therefor.

In item (75), under "Inventors", in Column 1, Line 2, delete "Malaga" and insert -- Málaga --, therefor.

In the Specification,

In Column 18, Line 56, delete "station 114," and insert -- station 118, --, therefor.

Signed and Sealed this
Seventeenth Day of May, 2016

Michelle K. Lee
*Director of the United States Patent and Trademark Office*